July 20, 1965     H. B. VAN DORN     3,195,965
LUBRICATING MEANS FOR AN ANTIFRICTION BEARING
Original Filed Sept. 30, 1955     2 Sheets-Sheet 1
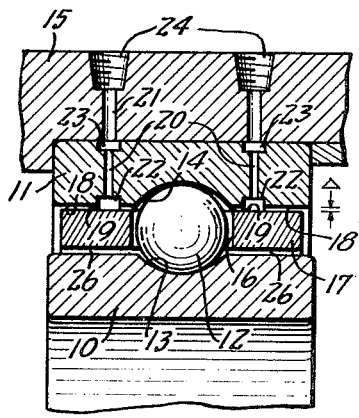
INVENTOR
HORACE B. VAN DORN
BY
ATTORNEYS

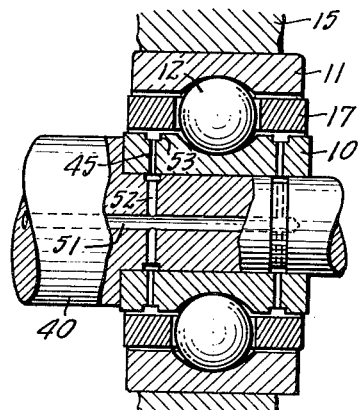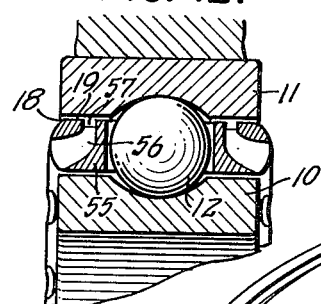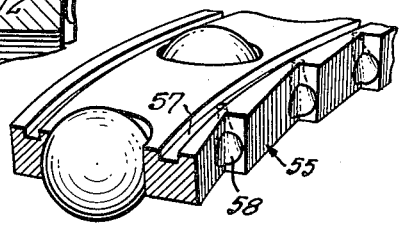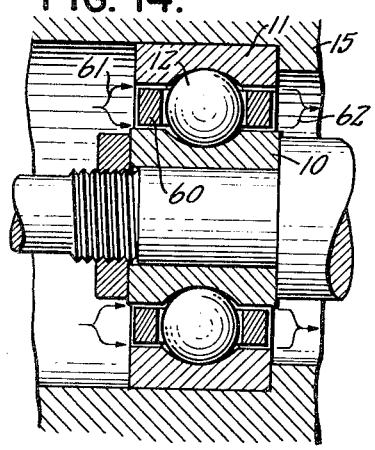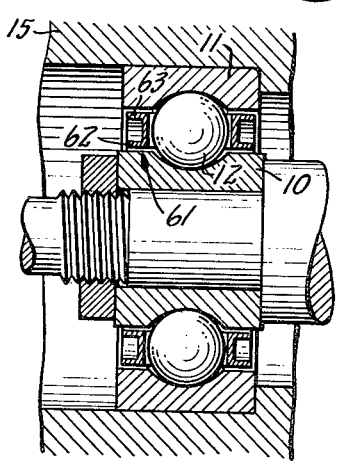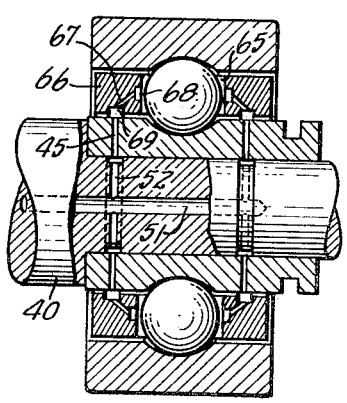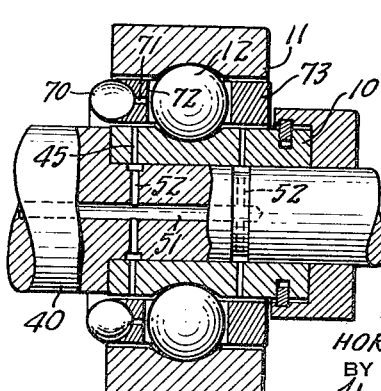

United States Patent Office 3,195,965
Patented July 20, 1965

3,195,965
LUBRICATING MEANS FOR AN ANTI-FRICTION BEARING
Horace Bishop Van Dorn, New Britain, Conn., assignor to The Fafnir Bearing Company, New Britain, Conn., a corporation of Connecticut
Continuation of abandoned application Ser. No. 537,725, Sept. 30, 1955. This application Oct. 25, 1961, Ser. No. 148,794
7 Claims. (Cl. 308—187)

This application is a continuation of my copending application Serial No. 537,725, filed September 30, 1955, and abandoned after the filing of the present application.

My invention relates to antifriction-bearing constructions, and in particular to those which must be subjected to wide extremes of temperature and to high speeds of rotation, as in jet-engine operation.

It is an object to provide an improved bearing construction.

It is another object to provide improved means for reducing friction in an antifriction bearing.

It is another object to provide an improved antifriction bearing lending itself to lubrication with a continuous flow of lubricant fluid.

It is a specific object to provide an air-lubricated antifriction bearing.

It is another specific object to provide a means whereby retainer drag against a bearing ring may be substantially eliminated in an antifriction bearing.

Other objects and various further features of novelty and invention will become apparent or will occur to those skilled in the art from a reading of the following specification in conjunction with the accompanying drawings. In said drawings, which show, for illustrative purposes only, preferred forms of the invention:

FIG. 1 is a fragmentary longitudinal sectional view through a seated bearing incorporating features of the invention;

FIGS. 1A, 2, 3, 4, 5, and 6 illustrate modifications of the arrangement of FIG. 1;

FIG. 7 is a longitudinal sectional view of an alternative bearing of the invention;

FIG. 8 is a sectional view in the plane 8—8 of FIG. 7;

FIGS. 9 to 12 are further longitudinal sectional views illustrating modifications;

FIG. 13 is an enlarged fragmentary view in perspective illustrating modification of a part of FIG. 12; and FIGS. 14 to 17 are longitudinal sectional views illustrating further modifications.

Briefly stated, my invention contemplates the substantial reduction in drag in an antifriction bearing under a wide range of temperature conditions by employing a continuous flow of air (or oil mist suspended in air) as a lubricating means. For caged or retained antifriction elements, I provide in conjunction with such lubricating means, means inherently radially spacing the retainer out of possible contact with either of the bearing rings, thus eliminating retainer drag. The lubricating fluid, such as air or oil mist, may be introduced directly between the race rings of the bearing, but in most of the forms to be described, I provide novel arrangements of passages including manifolds for assuring circumferentially uniform distribution of fluid within the bearing. The various forms are described in application to ball bearings, but since the invention is applicable to antifriction bearings in general, roller bearings will be understood as also contemplated.

Referring to FIG. 1 of the drawings, my invention is shown in application to an antifriction bearing comprising an inner ring 10, an outer ring 11, and antifriction elements 12 riding in raceways 13–14 in the respective rings 10–11. The outer ring 11 is shown seated in a member 15, and the antifriction elements 12 are accommodated in individual pockets 16 of a circumferentially continuous retainer ring 17.

In accordance with a feature of the invention, the retainer drag is avoided and the bearing is lubricated by inducing a continuous flow of lubricant between closely spaced circumferentially extending surfaces on one of the bearing rings and on the retainer ring. In the form shown, the closely spaced surfaces comprise inner lands 18 on the outer bearing ring 11 and outer lands 19 on the retainer ring 17. The close spacing between these surfaces is designated by the symbol Δ and is preferably of the order of a few thousandths of an inch. The means for inducing a continuous flow of lubricant into the spaces between surfaces 18–19 may include communicating passages 20–21 in the outer ring 11 and seat 15, respectively. The passages 20 are preferably provided in plurality at angularly spaced locations around the outer ring 11. To promote greater circumferential uniformity in the application of fluid flow in the space between surfaces 18–19, manifolding means such as an inner circumferentially extending groove 22, may be provided for each set of passages 20. In order that the passages 20 may be uniformly supplied with pressure fluid, further manifolds may be provided as outwardly facing grooves 23 in the ring 11. Pressurized air or air mixed with graphite, oil droplets, or other lubricating element is admitted at 24 by means forming no part of the invention and, therefore, not shown.

In application to aircraft turbines, it will be understood that an adequate supply of high-pressure air may be available by bleeding to supply the passages 21. Nevertheless, regardless of the source of such air supply, strong radial supporting forces will be developed circumferentially uniformly of the space between surfaces 18–19 and, regardless of the speed of operation, there is no tendency of the retainer 17 to contact either of the rings 10–11; retainer drag is thus subsatntially eliminated. By fabricating the passages 22 axially relatively close to the ball pockets 16, it is assured that a continuous flow of air (or lubricant in the air) may pass to the ball pockets. Such flow may be promoted by admitting air under pressure at the left passage 21 and by exhausting the same at the right passage 21'. Alternatively, if air is admitted at both passages 21–21', it will tend to be exhausted through the pockets 16 and the clearance 26 between the inner ring 10 and the retainer 17.

In FIG. 1A, I illustrate a slight modification incorporating a sheet-metal cage 27 with an elongated flange 28 for close spacing opposite the manifold groove 22 in the outer ring 11. I also illustrate that the manifolding means for the passages 20–21 may be a groove 29 formed in the seat 15, rather than in the outer bearing ring 11 as in FIG. 1.

The arrangement of FIG. 2 resembles FIG. 1, except that it illustrates provision of manifolding means in the retainer ring 17, as by forming a circumferentially continuous outwardly facing groove 30 in the surface 18. The manifold 30 is preferably so positioned as to communicate directly with the passages 20, as will be understood.

The arrangement of FIG. 3 illustrates a slight modification wherein manifolding means between the seat passage 21 and the outer-ring passages 20 is achieved by a laterally facing circumferential groove 31 in the ring 11. The passage 21 then communicates with the side (or axial end) and not with the outer surface of the outer bearing ring 11.

FIG. 4 illustrates a modification of FIG. 3, in that the circumferential manifold between passages 20–21 is provided as a groove 33 in the seat 15.

The arrangement of FIG. 5 resembles that of FIG. 4 except that circumferential distribution of pressure fluid is made more uniform by the provision of an intermediate block or ring 34 constituting, in effect, part of the seat 15. The block 34 has formed therein two manifolds 35–36 connected by a plurality of passages 37 and respectively communicating with the passage 21 in the seat 15 and with the passages 20 in the outer ring 11.

The arrangement of FIG. 6 achieves the function described for FIG. 5 without a sacrifice of strength of the ring member 34'. The manifolds which assure circumferentially uniform distribution of lubricating fluid pressure are merged into one by provision of an enlarged bevel 38 on the ring 34'. The manifold defined along the bevel 38 communicates between passage 21 and passages 20.

In the arrangement of FIGS. 7 and 8, distribution of fluid to the retainer 17 is achieved by flow originating in the shaft 40 on which the bearing is mounted. The fluid flow is derived upon shaft rotation, and for this purpose blade elements 41 on a single hub 42 may coact with a suitably contoured shroud 43 to ram air into an axially extending passage 44 in the shaft 40 and communicating with radial passages 45 in the inner ring 10. To promote uniform circumferential distribution of flow, I show manifolding means, such as grooves 46, traversing the grooves 44 and extending circumferentially continuously at the axial locations of passages 45.

In FIG. 9, lubricating flow is also supplied by way of the shaft 40, as along the groove 44', but reliance is had on an externally derived pressure-fluid source, connected to shaft 40 at 47, and communicating with groove 44' by way of a passage 49. The manifolding means is shown as inwardly facing grooves 50 in the bore of the inner bearing ring 10.

The arrangement of FIG. 10 resembles that of FIG. 9 except that pressure fluid is admitted through a central passage 51 in the shaft 40, and is radially distributed to the manifolds 50 by means of one or more radial passages 52 in the shaft 40. In FIG. 11, still further uniformity of circumferential distribution is assured by additional manifolds 53 formed as outwardly facing grooves on the inner bearing ring 10.

Thus far, all arrangements have been described as deriving lubricating air or other pressurized fluid by way of the seat or by way of the shaft. However, in FIG. 12, I show an arrangement in which the desired flow is derived solely by virtue of retainer motion during high-speed operation of the bearing. The retainer 55 of FIG. 12 is provided with a plurality of angularly spaced internal passages 56 for accommodating pressure fluid and outwardly facing manifold grooves 57 assure circumferentially uniform distribution of flow in the region defined between closely spaced surfaces 18–19. As distinguished from the other forms, the passages 56 face axially outwardly away from either of the bearing rings 10–11 and are preferably skewed from strictly parallel relation with the bearing axis, in such manner as to present scoop openings for self-developed fluid pressure under high-speed rotating conditions. In the modification of FIG. 13, the outwardly facing edge of the retainer 55 is shown serrated or fluted, and possibly canted, with the scoop openings 58 thus caused to face more directly against the fluid medium when rotated (counterclockwise, in the sense of FIG. 13), all to the extent necessary to enhance scoop action and lubricating efficiency.

In FIGS. 14 and 15, sufficient lubrication is achieved, and the retainer ring 60 is centrally positioned, merely by continuous flow of air or oil-laden air in the direction indicated by the arrows 61–62. Such air may be available as ram air in aircraft-turbine applications. The only difference between FIGS. 14 and 15 is that the retainer 60 is a solid casting and the retainer 61 of FIG. 15 is a formed sheet-metal cage, with outwardly facing elongated flanges 62–63 in closely spaced overlapping relation with corresponding lands on the inner and outer bearing rings 10–11.

The arrangement of FIG. 16 illustrates means whereby more positive ball-pocket lubrication, as in the pocket 65, is assured while achieving the desired object of eliminating drag of the retainer 66. The fluid-supply mechanism resembles that of FIG. 11, and the parts have, therefore, been given the same reference numerals. The retainer 66 is provided with internal passages 67 communicating with the respective ball pockets 65, and circumferentially uniform distribution of flow is promoted by a circumferentially continuous manifold or groove 68 facing all ball pockets 65, and by an inner groove 69 facing all radial passages 45.

In the arrangement of FIG. 17, the ball pockets are lubricated directly by scoop mechanisms 70 associated with individual passages 71 communicating with each ball pocket 72. The scoops 70 and passages 71 are formed as part of the unitary retainer 73. The retainer support in the space between bearing rings 10–11 is provided by a shaft-distribution system 45 in the manner described for FIGS. 10 and 11.

It will be seen that I have described relatively simple mechanisms whereby bearings may be lubricated by a film of continuously flowing liquid, such as merely air flow or air flow laden with oil mist, graphite, or other lubricant suspension. With lubricant of such low viscosity, it is possible to operate aircraft turbines through great extremes of temperature within short spaces of time, as for example from a cold start of 90° F. directly to a hot-run temperature in the vicinity of 1000° F. Since lubrication in my bearings relies primarily on air, and since air is available in profusion in aircraft-turbine engines, the problem of lubricant supply is relatively insignificant. Ram air or bleed air from the compressor section of the engine may be readily fed through manifolds directly to the critical areas of friction. In addition, an air cushion is maintained between the retainer and either one of the bearing rings, which ever is relied upon for air-cushion guiding. In spite of the absence of drag between the retainer and the nearest bearing ring, I prefer that the coefficient of expansion for bearing rings and for the retainer rings be matched, inasmuch as clarances at the location of the air cushion must be closely held for most efficient support. While I have used the term "fluid flow" primarily in reference to air flow, or oil-laden flow, it will be understood that the use of pure oil or other lubricant at appropriate temperature ranges is contemplated, depending upon the application.

While I have descibed the invention in detail for the preferred forms shown, it will be understood that modifications may be made within the scope of the invention as described in the claims which follow.

I claim:

1. An antifriction bearing, comprising spaced rings having opposed raceways therein, antifriction elements riding said raceways and spacing said rings, and retainer means embracing said elements and holding the same in angualrly spaced relation, said retainer means and one of said rings having opposed adjacent circumferentially continuous surfaces in closely spaced relation, means including an annular air-supply fluid passage in said retainer means and communicating circumferentially uniformly with the space between said surfaces, and pressurized air-supply means including radially directed passage means communicating with said annular passage for circumferentially uniformly inducing a fluid flow between said surfaces.

2. An antifriction bearing, comprising spaced rings having opposed raceways therein, antifriction elements riding said raceways and spacing said rings, and retainer means embracing said elements and holding the same in angularly spaced relation, said retainer means and one of said rings having opposed adjacent circumferentially continuous surfaces in closely spaced relation, a circumferential manifold in one of said surfaces intermediate the limits of overlap of said surfaces, said manifold being a circumferential groove in said one surface, and pressurized air-supply means including a passage in said one ring and communicating with the volume defined by said manifold.

3. An antifriction bearing, comprising spaced rings having opposed raceways therein, antifriction elements riding said raceways and spacing said rings, and retainer means embracing said elements and holding the same in angularly spaced relation, said retainer means and one of said rings having opposed adjacent circumferentially continuous surfaces in closely spaced relation, a circumferentially continuous radially extending groove in one of said closely spaced surfaces intermediate the limits of overlap of said surfaces and defining with said other surface a manifold, and pressurized air-supply means including a passage in said one ring and communicating with the volume defined by said manifold.

4. A bearing according to claim 3, in which said manifold is a circumferential groove in said one surface, and said one surface is on said one ring.

5. A bearing according to claim 3, in which said manifold is a circumferential groove in said one surface, and said one surface is on said retainer means.

6. An antifriction bearing, comprising inner and outer rings having raceways therein, antifriction elements riding said raceways and spacing said rings, retainer means holding said elements in angularly spaced relation, said retainer means comprising a circumferentially continuous ring having element-receiving pockets therein, one of said inner and outer rings having opposed circumferentially continuous axially extending overlapping surfaces, said retainer ring having a plurality of passages communicating between said pockets and the space between said surfaces, an annular groove in one of said surfaces facing the other of said surfaces intermediate the limits of axial overlap of said surfaces, and means circumferentially uniformly inducing a fluid flow between said surfaces at said groove, said flow being sufficient of itself to position said retainer means out of contact with said one ring, whereby flow in said passages to said pockets may also be assured.

7. In combination, inner and outer bearing rings having raceways therein, antifriction elements riding said raceways and spacing said rings, retainer means embracing said elements and holding said elements in angularly spaced relation, a seat circumferentially continuously accommodating said outer ring, there being opposed circumferentially continuous axially extending overlapping surfaces on said retainer means and on the outer of said rings, one of said surfaces having in the region of overlap with the other of said surfaces a circumferentially continuous radial groove defining with said other surface a manifold, pressurized air-supply means including communicating passages in said seat and outer ring and including a circumferential manifold groove on said outer ring and communicating with the passage in said seat for circumferentially uniformly inducing a pressurized flow of air between said surfaces, and said passages communicating directly with the region of the groove in the overlap of said surfaces.

References Cited by the Examiner
UNITED STATES PATENTS

| 1,320,703 | 11/19 | McClellan | 308—122 |
| 2,625,448 | 1/53 | Underwood | 308—78 |
| 2,674,904 | 4/54 | Dickson | 308—122 XR |
| 2,681,259 | 6/54 | White | 308—121 |
| 2,977,161 | 3/61 | Cobb | 308—187 |

ROBERT C. RIORDON, *Primary Examiner.*
RICHARD A. DOUGLAS, FRANK SUSKO,
*Examiners.*